July 28, 1959 E. A. DIEMAN 2,897,060
ACCELERATED CONDENSATION CORROSION TESTING SYSTEM
Filed April 30, 1956 3 Sheets-Sheet 1
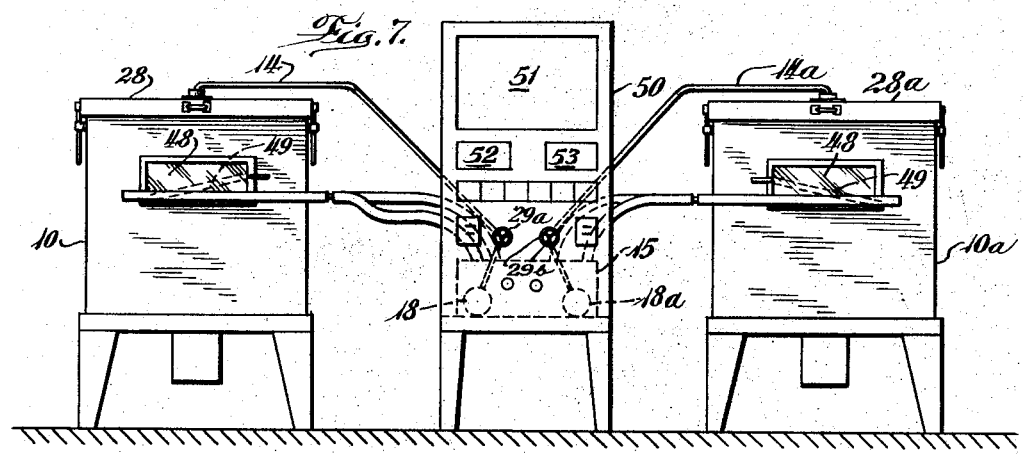
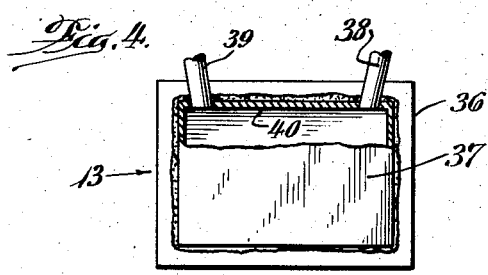
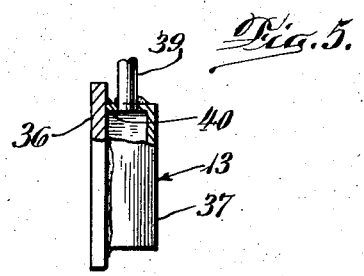
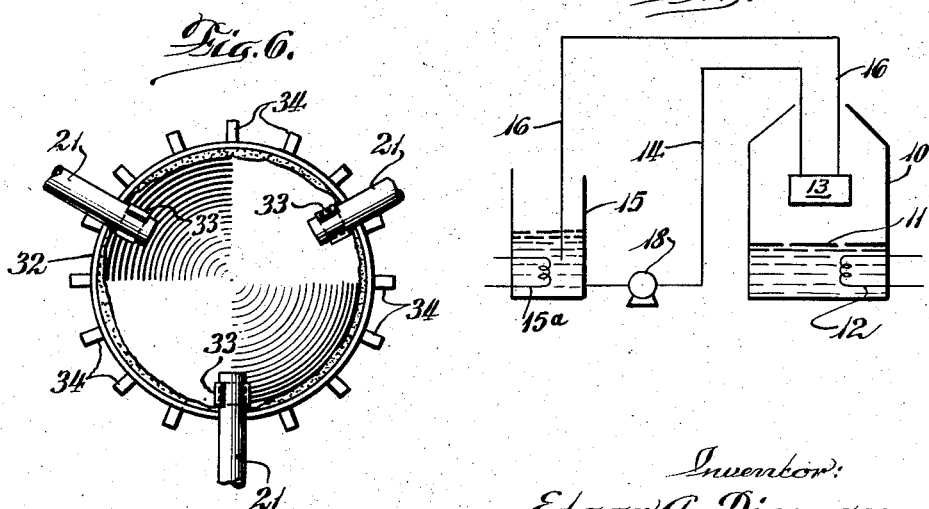
Inventor:
Edgar A. Dieman
By Everett A. Johnson
Attorney

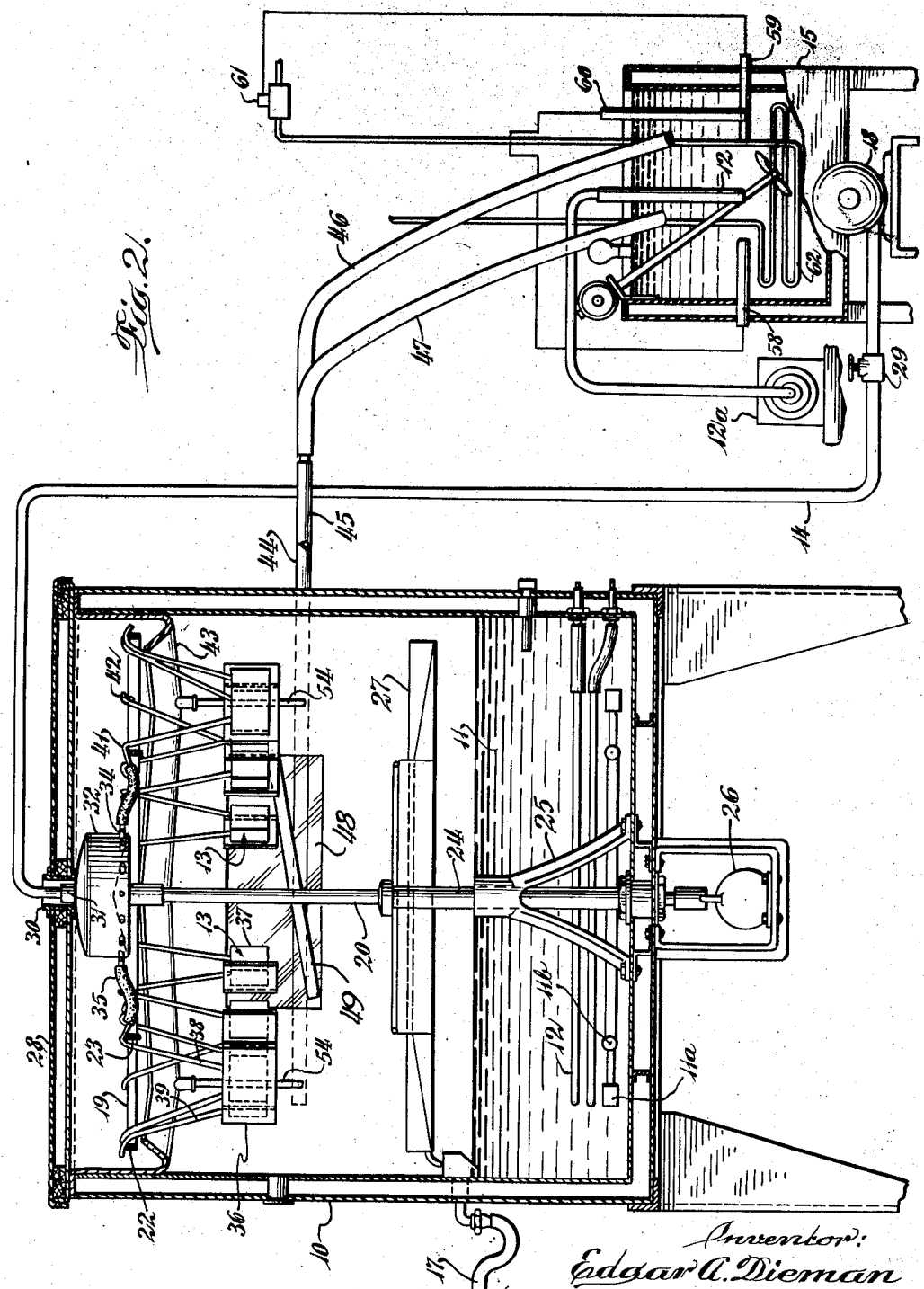

July 28, 1959 E. A. DIEMAN 2,897,060
ACCELERATED CONDENSATION CORROSION TESTING SYSTEM
Filed April 30, 1956 3 Sheets-Sheet 3
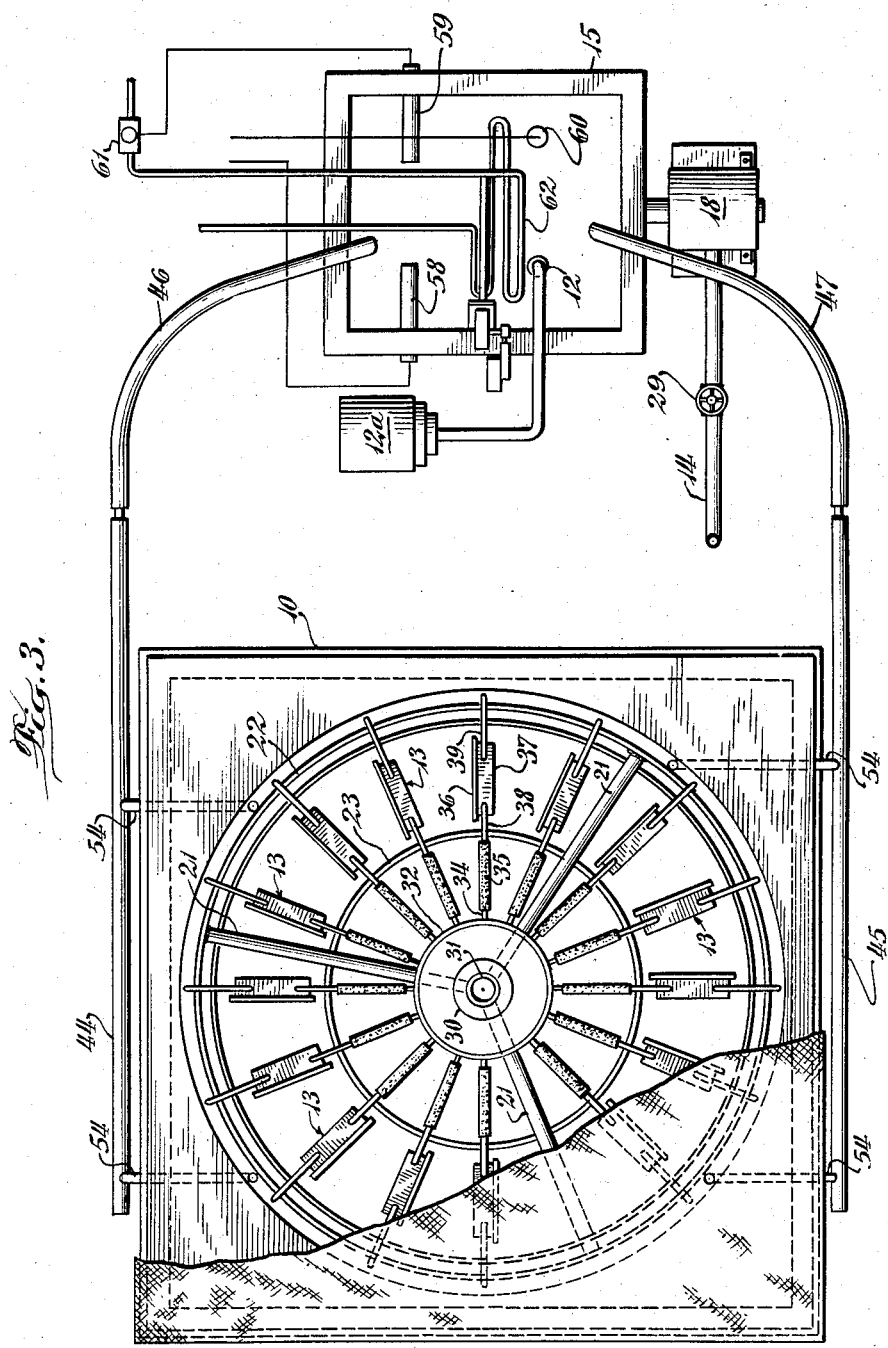

United States Patent Office 2,897,060
Patented July 28, 1959

2,897,060

ACCELERATED CONDENSATION CORROSION TESTING SYSTEM

Edgar A. Dieman, Crown Point, Ind., assignor to Standard Oil Company, Chicago, Ill., a corporation of Indiana Application April 30, 1956, Serial No. 581,486

4 Claims. (Cl. 23—253)

This invention relates to a system for conducting corrosion tests on specimens for evaluating anti-corrosion properties of rust preventive compositions applied to the specimens. More particularly, the invention relates to an apparatus for conducting such corrosion tests in humid atmospheres.

Heretofore, so-called humidity test cabinets have been provided for evaluating the corrosion preventive properties of compositions, but such prior apparatus has been unsatisfactory for a number of reasons. Results obtained in the prior equipment not only varied between cabinets but in the same cabinet. Furthermore, the time for conducting the tests was very long requiring more than 1000 hours and tests on the same product varied as much as several hundreds of hours.

It is, therefore, a primary object of my invention to provide a system which gives accelerated and reproducible results in evaluating the anti-corrosion properties of rust preventive compositions. It is a further object of the invention to provide an apparatus for conducting tests on individual compositions separately or a plurality of compositions simultaneously. An additional object of the invention is to provide a humidity test cabinet which is simple in construction and foolproof in operation. Still another object is to provide a system for obtaining accelerated, accurate and reproducible anti-rust performance of a composition by inducing condensation on prepared steel specimens by temperature differential. It is also an object of my invention to provide a novel test panel construction which permits maintaining such temperature differential. These and other objects of the invention will become apparent as the description thereof proceeds.

Briefly, according to my invention, I provide a humidity cabinet wherein the test panels are maintained at a temperature differential with respect to the atmosphere within the cabinet, the metal specimens or panels being maintained at a constant temperature by circulating a cooling fluid through the individual panel structures. These structures comprise the standard corrosion panel forming one wall of a box-like chamber. The panel structure is suspended within an atmosphere of humid air with the temperature of the humid air maintained higher than the temperature of the test panel. Cooling fluid inlet and outlet are provided for the box-like chamber to permit the desired circulation of cooling fluid.

By maintaining the temperature differential, condensation is created and rust forms on the steel panel giving reproducible and accelerated indications of the anti-rust properties of the corrosion preventive composition being tested.

Further details of construction and advantages of the invention will be described by reference to the accompanying drawings forming a part hereof and wherein:

Figure 1 illustrates schematically the principles of the invention;

Figure 2 is an elevation, partly in section, of a corrosion testing cabinet embodying the features of the invention;

Figure 3 is a plan view, with some parts removed, of the apparatus shown in Figure 2;

Figures 4 and 5 are enlarged views illustrating the construction of the test panels;

Figure 6 is a bottom view of the dispensing tank included in Figures 2 and 3; and Figure 7 is an elevation illustrating a single control unit for a pair of corrosion testing cabinets.

Referring to Figure 1, the cabinet 10 has a pool 11 of water in the lower portion thereof with a heater 12 immersed therein. Water vapor is generated to provide a humid atmosphere within the cabinet 10. The test panel 13 is suspended within the cabinet 10 above the level of the pool 11. A first conduit 14 extends from tank 15 and discharges into panel 13. A second conduit 16 extends from panel 13 and discharges into tank 15. Constant temperature means 15a (described in more detail with reference to Figures 2 and 3) maintains the circulating liquid within tank 15 at a temperature level which will provide the desired temperature differential between the panel structure 13 and the atmosphere within the cabinet 10. A pump 18 on line 14 is provided from the controlled flow of temperature-controlled circulating fluid through the panel structure 13.

A preferred embodiment of an apparatus embodying the principles illustrated by Figure 1 is shown in Figures 2 to 7, inclusive. In this embodiment, there is provided a cabinet 10 having a pool 11 of water in the lower portion thereof and in which electric heaters 12 are immersed. Air is introduced through a number of distributors 11a which are supplied by an annular manifold 11b whereby water vapors are generated and provide the humid atmosphere within the cabinet 10. A rotating stage 19 is mounted on the vertical drive shaft 20 and comprises spokes 21 together with the notched racks 22 and 23. The drive shaft 20 is supported within sleeve 24 which in turn is held by tripod 25. A motor 26 drives the shaft 20 whereby the stage 19 is rotated slowly within the cabinet 10.

A condensate drip pan 27 is supported above the level of the pool 11 and directs condensate and oil drippings to the sewer via outlet means 17.

The coolant tank 15 exterior to the humidity cabinet 10 has sufficient heating and cooling equipment and controls (as shown in Figures 2 and 3) to maintain a ±0.5° F. temperature in the range of from 80° F. to about 120° F. or higher. A small centrifuge pump 18, having a capacity of about 7 gallons per minute, discharges through copper or equivalent tubing 14 to the center of the cover 28 of the humidity cabinet 10. A valve 29 on line 14 next to the pump 18 controls the amount of water circulated through the system.

The cover 28 of the cabinet 10 is of cloth and near the center thereof I provide a stainless steel spool 30, the opening through which is about 2 inches in diameter. This spool 30 is disposed about the tube 31 which extends from the top of the dispensing or manifold tank 32. The tank 32 has a sloping top and a raised conical bottom, the tank 32 being about 6 inches in diameter and about 2.5 inches high. The spool 30 rests on the top of this tank 32 when the cover 28 is closed. The dispensing tank 32 is held in place on top of the rotating stage 19 by three clips 33 which engage the spokes 21. Thus, the cooling fluid is delivered by line 14 through the spool 30 into the dispensing tank 32.

About the periphery of the dispensing tank 32 and adjacent the conical bottom thereof, I provide a plurality (15 are shown in the drawing) of evenly spaced spouts 34 which may suitably comprise 0.25 inch stainless steel tubing, the spouts 34 extend outwardly and radially from the bottom edge of the tank 32. To the spouts 34 are attached short flexible connectors 35 which may suitably comprise rubber tubing.

The test specimens or panels 13 are made (as shown in Figures 4 and 5) by affixing SAE 1020 steel panels 36 of about 2 inches by 4 inches in size to stainless steel boxes 37 which are somewhat smaller than the panels 36 and about 0.5 inch deep. An inlet tube 38 and an outlet tube 39 enter the top wall 40 of the panel structure 13. The open ends of the tubes 38 and 39 comprise 90° bands to provide suspending hooks 41 and 42, the hooks being secured by the notched racks 22 and 23. A flexible connector 35 is fixed to an inlet tube 38 and the outlet tube 39 discharges into an annular collecting trough 43 which is supported by the inner wall of the cabinet 10. The trough 43 is disposed directly below the outer rack or rim of the rotating stage 19 so that outlet tube 39 will discharge the circulating fluid from the panel structure 13 into the collecting trough 43. To facilitate speedy flow of the circulating liquid from the trough 43, I provide four outgoing spouts 54 which extend downward from downwardly pitched sections of the trough 43. The spouts 54 in turn pass through the walls of the cabinet 10 and discharge into manifolds 44 and 45. Return lines 46 and 47 receive the flow from the manifolds 44 and 45 and recirculate the circulating fluid to the tank 15. The dead ends of the manifolds 44 and 45 are about 4 inches lower than the bottom edge of the collecting trough 43 and the open ends of the manifolds 44 and 45 are about 5 inches lower at the point of connection to the return lines 46 and 47 to assure swift return of the circulating water to the cooling tank 15.

The front wall of the cabinet 10 is fitted with a double glazed window 48 in alignment with the suspended panels 36. The inner pane of the window 48 can be swept of condensate by means of a wiper blade 49 operated from outside of the cabinet 10. Likewise, the condensate on the window 48 may be avoided by drawing warm air between the two panes thereby keeping the temperature of the window 48 slightly above the dew point of the cabinet atmosphere. In this manner, the rotating speciments or panels 13 may be viewed through the window 48 and the extent of rust formation observed from time to time during the test.

In operating the described equipment, the steel test panel 36 is sand blasted and washed with hot naphtha and hot methyl alcohol. The panels 36 are then slushed into rust preventive compositions being tested, as well as a standard composition used as a reference, and treated overnight by perpendicularly suspending the panel structure 13. When accelerated conditions are not imposed, the atmosphere within the cabinet 10 is maintained at a temperature of about 122° F. and the cooling bath in tank 15 is maintained at 100° F. The panel structures 13 are hung on the rotating stage 19 and the flexible connectors 35 are fixed to the inlet tubes 38 of each panel structure 13. If less than the total number of specimens 13 are to be tested, the panel structures of the same construction, but of stainless steel composition, should be put in place and run as blanks so that constant condensation is obtained for all test runs. The test panels are all hung in a non-horizontal and preferably vertical plane so that condensate and oil may run-off in a uniform manner.

With the cabinet cover 28 open, the circulating water is pumped through the system and the water flow through the specimen checked and all specimens should have uniform flow therethrough. The dispensing tank 32, carried at the top of the rotating stage 19, should be kept full during operation by adjusting the valve 29 adjacent to the pump 18. This assures equal pressure head and maximum flow through each specimen. With a water temperature in the cabinet at 130° F. to give an initial cabinet atmosphere of 120° F. ±2° F., the passage of cooling water at a temperature of 100.5° F. ±0.5° F., produces a cabinet atmosphere temperature during the test of about 112° F. ±1.5° F. Under these conditions, the test panels 13 are maintained at a temperature of about 101° F.±0.5° F. providing an effective temperature differential of from 9 to 13° F. In general, I have found that a temperature differential of about 10° F. will accelerate the corrosion test to the extent that about 5 hours are required to complete a test whereas as many as several hundred hours have been required for testing the same composition heretofore.

With my apparatus I have obtained repeatability under identical conditions for a given percentage of surface rusted of, for example, 5 hours plus or minus ½ hour whereas, heretofore, repeatability was, for example, 250 hours plus or minus about 200 hours.

In Figure 7, I have illustrated another arrangement of cabinet 10 and 10a and with the controls for the circulating fluid being similar to that shown in more detail in Figures 2 and 3. It includes an instrument panel 50 which is provided with a multipoint temperature recorder 51, a pair of temperature controllers 52 and 53, and two pumps 18 and 18a within a single coolant water tank 15. Valve controls 29a and 29b control the flow to each of cabinets 10 and 10a and temperature regulator controls 58 and 59 control the intermittent heater 60 and the solenoid valve 61 on the intermittent water cooling coil 62.

Although the invention has been described by reference to particular embodiments thereof, it is to be understood that these are by way of illustration only and that they are not intended to limit the invention thereto since alternative embodiments and constructions of the invention and the mode of operation will become apparent to those skilled in this art in view of my description of the invention.

What I claim is:

1. A humidity test apparatus of the type comprising cabinet means for maintaining a humidity atmosphere at an elevated temperature, and a rotating stage within said cabinet means, said stage having means for supporting a plurality of test panels, the improvement which comprises heat exchanger means integral with a test panel on such rotating stage, said heat exchanger means including a fluid receiving chamber, an inlet tube for said chamber, an outlet tube for said chamber, hook means at the upper ends of said inlet tube and said outlet tube for suspending said heat exchanger means on said rotating stage, circulating fluid manifold tank means disposed within said cabinet and supported on said rotating stage, an inlet for said manifold tank means in an upper wall thereof, a plurality of vent spouts arranged about the periphery of said manifold tank adjacent the bottom thereof, flexible connector tubes disposed between the discharge ends of said spouts and said inlet tube means, exterior cooling tank means, conduit means extending between said cooling tank and said manifold tank, pump means on said conduit means, an annular collecting trough within said cabinet disposed below said outlet tube means and adapted to receive flow therefrom, conduit manifold means for receiving the waste from said collecting trough means, and second conduit means for returning fluids from said manifold tank means to said cooling tank.

2. The apparatus of claim 1 wherein the fluid-receiving chamber comprises a box-like housing with a test panel forming a wall thereof.

3. A humidity test apparatus for metal panels comprising a cabinet having a water supply sump in its bottom portion, a heater disposed in the sump for generating vapor to produce conditions of high humidity in the said cabinet, a fabric cover for said cabinet, a rotatable stage within said cabinet for supporting test panels above the level of the sump, means for rotating said stage, at least one cooling fluid reservoir removably carried by said rotatable stage, a test panel forming a wall of said cooling fluid reservoir, inlet means for said reservoir, outlet means for said reservoir, hook means at the upper ends of said inlet and outlet means on which said reservoir and unitary test panel are suspended from said rotatable stage, manifold tank means supported on said rotatable stage, inlet means for said manifold tank, conduit means for connecting the said manifold tank with said inlet means, cooling tank means exterior of said cabinet, conduit means extending between said cooling tank means and said manifold storage tank extending through said cover, and pump means on said last-named conduit means for flowing cooling fluid sequentially through said manifold storage tank, said cooling fluid reservoir in heat exchange with said test panel, and back to said cooling tank means.

4. A humidity test apparatus for evaluating the efficiency of rust preventive compositions on a test specimen, the improvement which comprises a rotating stage for suspending such test specimen within a cabinet in the presence of a hot humid atmosphere, a test specimen forming one wall of a box-like heat exchanger chamber, means for flowing a coolant fluid through said chamber over the enclosed surface of said test specimen continuously and uniformly so as to maintain a selected temperature differential between the exposed surface of said specimen and the hot humid atmosphere in said cabinet, an inlet tube communicating with said chamber and an outlet tube discharging from said chamber, the upper ends of said inlet and said outlet tubes being hook shaped for suspending the said structure on said rotating stage, said means for flowing the coolant fluid including an exterior coolant tank, an interior manifold dispensing tank, an annular coolant fluid collecting trough within said cabinet, and removable connector means between said interior manifold tank and said box-like chamber, whereby coolant fluid may flow from said coolant tank into said manifold tank, through said connectors, through said box-like chamber, and into said collecting trough for return to said coolant tank.

References Cited in the file of this patent

UNITED STATES PATENTS

| | | |
|---|---|---|
| 1,818,687 | Buttolph | Aug. 11, 1931 |
| 2,405,532 | Todd | Aug. 6, 1946 |
| 2,521,921 | Kolar | Sept. 12, 1950 |

OTHER REFERENCES

Uhlig: "Corrosion Handbook," 1948, page 960.

Champion: "Corrosion Testing Procedures," 1952, 1st ed., pages 132 and 133.

Groggins: "Unit Proc. in Org. Synthesis," 1938, 2nd ed., page 383.